United States Patent [19]
Evans et al.

[11] Patent Number: 4,770,415
[45] Date of Patent: Sep. 13, 1988

[54] GAME

[75] Inventors: David J. Evans; David K. Thomas, both of Cardiff, United Kingdom

[73] Assignee: Video Fruit Services Limited, Cardiff, United Kingdom

[21] Appl. No.: 914,644

[22] Filed: Oct. 2, 1986

[30] Foreign Application Priority Data

Oct. 4, 1985 [GB] United Kingdom ............... 8524557

[51] Int. Cl.⁴ .............................................. A63F 9/00
[52] U.S. Cl. .................................. 273/1 E; 273/1 GC
[58] Field of Search ................ 273/1 GE, 1 GC, 1 E, 273/85 G, 148 B, 237, 138 A

[56] References Cited

U.S. PATENT DOCUMENTS

| | | | |
|---|---|---|---|
| 3,604,707 | 9/1971 | Hurley | 273/85 G |
| 4,264,072 | 4/1981 | Chalmers | 273/85 G |
| 4,429,880 | 2/1984 | Chen et al. | 273/2 X |
| 4,433,844 | 2/1984 | Hooker et al. | 273/138 A X |
| 4,440,036 | 4/1984 | Hooker et al. | 273/143 R X |
| 4,512,567 | 4/1985 | Phillips | 273/DIG. 28 X |
| 4,558,864 | 12/1985 | Medwedeff | 273/148 B |

FOREIGN PATENT DOCUMENTS

159898 4/1985 European Pat. Off. .
2067419 7/1981 United Kingdom ............... 273/856

Primary Examiner—T. H. Tubbesing
Assistant Examiner—Gilberto Barrón, Jr.
Attorney, Agent, or Firm—Merchant, Gould, Smith, Edell, Welter & Schmidt

[57] ABSTRACT

An electronic game simulates a shove-a-coin game by causing successive illumination of lights on a display, which simulates movement of a coin, in response to the activation of a control button. The final position of the "coin" relative to a scale is determined by the speed, or total distance of movement, of the button, and that final position determines the result of the game, which may be indicated by suitable indicators adjacent the scale. The control of the movement of the "coin" is such that, for speeds or distances of movement of the button less than a first value, the "coin" does not move, whereas for speeds or distances of movement of the button greater than a second value, the "coin" moves to an end position, corresponding to a losing result. Thus the skill of the game is to activate the button by the right amount to cause the "coin" to move to a winning position at some intermediate point along the scale.

17 Claims, 6 Drawing Sheets

GAME

BACKGROUND OF THE INVENTION

1. Field of the Invention

The present invention relates to an electronic game which simulates games involving movement of an object such as shove-a-coin.

2. Description of the Prior Art

Current electronic games generally fall into one of two types. Firstly, there are the fruit machine games, in which the result of the game is determined by chance rotation of reels. These machines are primarily for commercial use. Secondly, there are video games in which a computer display is controlled by the player under the influence of a program in the machine. The use of such games is either commercial or private.

The present invention is primarily envisaged as a development of the fruit machine type of game, but in which the chance element is replaced by control dependant on the skill of the player. However, it could also be applied to a video game. In its broadest concept the present invention envisages a game in which movement of one or more indicia on a display is controlled by the speed or distance of movement of a control such as a push-button.

However, this broad concept is, in fact, known, in some video games. Many video games attempt to recreate the movement of a ball about some surface. In the simplest games, the speed of the ball is fixed during the game, but in more complex arrangements the speed of the ball is determined by the conditions of impact with some player-controlled object. Thus, for example, FR No. 2416510 is concerned with a billiards type video game, in which a cue is moved over a screen displaying a table with billiard balls and when the cue is moved to a position in which it apparently impacts with a ball, the ball is moved on the screen, with an initial speed dependant on the instantaneous speed of impact of the cue on the ball. The course of movement of the ball is then determined by the boundaries of the table and by other balls displayed.

Similarly, in U.S. Pat. No. Re. 28,507, which is concerned with a video tennis game, there is again means for ensuring that the speed of movement of the ball is proportional to the impact speed of the racket, the position of which is controlled by the player. DT No. 2417484 is also concerned with the movement of an object representing a ball around the screen of the video game. There is mention of the movement of the ball being controlled in dependance on the spacing of the object from a player-controlled "figure".

The present invention, however, is not concerned with games which simulate the movement of a ball around an area, but is concerned with simulating games in which the object moves relative to a fixed scale, the scale defining locations corresponding to different game results. It is thus the purpose of the player-operated control to cause an indicium representing the object to move to some position corresponding to one of the locations on the scale.

A game of this type, has been disclosed in an article entitled "Marbles" in the magazine ELEKTOR No. 1 of January 1977. This disclosed a game in which the player tried to get the object to the position corresponding to the end of the scale, with movement of the object beyond that point causing the object to be reflected back down the scale. This game therefore simulated one version of "Marbles".

In that game, the distance the object moves is determined by the time the control button is depressed. At first sight this is satisfactory, but in fact this is not the case. If the time corresponding to a "win" is measurable by the player, then it is too easy to win. If, on the other hand, the time is short then other effects also become significant such as the delay caused by the fact that the control must move to activate the game, and that movement will also occupy time.

SUMMARY OF THE INVENTION

Therefore, the present invention proposes that the final position of the indicium relative to the scale should be determined by the speed or distance of movement of the control. Furthermore, there should be speed, or distance, limits above or below which the final position of the indicium does not correspond to one of the scale locations. Thus, if the control is pressed too fast, or too far, then the indicium goes off the end of the scale, whereas if the control is not pressed fast or far enough, the indicium never reaches the scale. Thus, for a shove-a-coin game the point of illumination, representing the moving "coin", may move different distances in dependance on the time taken to press the control a predetermined distance. The result of the game will then depend on the position at which the point of illumination stops.

The display preferably is a glass screen covering an array of lights which are illuminated in a sequence determined by the nature of the game so that the movement of the illumination represents the movement of the indicium. The scale is then represented by suitable markings on the glass. Alternatively, the display could be a video screen with the indicia being predetermined markings which move on the screen.

As a further development it is possible to arrange for a further control to permit movement of the indicia in a second direction. This could be used, for example, to permit the simulation of a glancing impact in shove-a-coin or spin in ten-pin bowling.

It is also possible for the ratio of the distance or speed of control movement to the distance of indicium movement to be variable, with a display indicating the selected one of the ratio possibilities.

Various mechanisms are possible for detecting the movement of the control. Preferably, however, the movable control includes a member having a plurality of apertures therein, and the means for detecting movement of the control and generating an electric signal includes at least one radiation source located adjacent one side of said member and at least one radiation detector, whereby movement of the control causes movement of the member such that radiation alternately passes from the source(s) to the detector(s) through the apertures, and is blocked by the parts of the member adjacent the apertures.

BRIEF DESCRIPTION OF THE DRAWINGS

Embodiments of the invention, will now be described in detail, by way of example, with reference to the accompanying drawings, in which.

DETAILED DESCRIPTION

Figure 1:
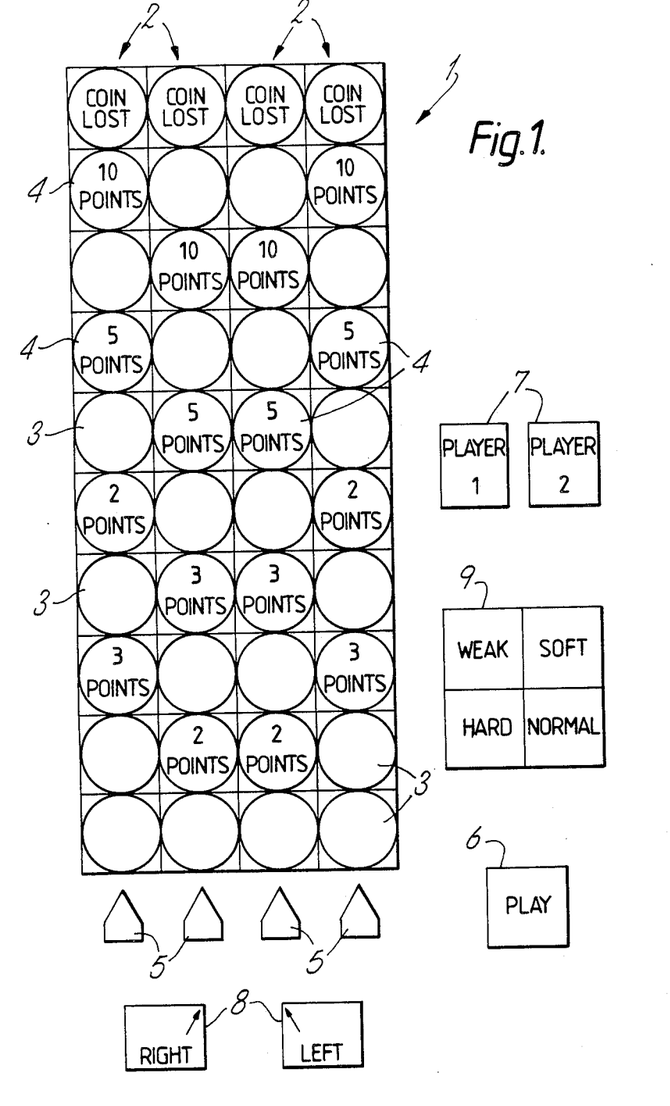
FIG. 1 shows a first embodiment of a shove-a-coin game.

Referring first to FIG. 1, a first embodiment of a game according to the present invention has a display 1 in the form of a glass screen marked with a scale having four columns 2 of markings 3 simulating coins. Some of the markings 4 represent scoring positions, the value of the score being indicated.

Lights 5 display the column currently in use; these lights 5 will be illuminated sequentially to allow the player to select on which column he wishes to play.

In operation, a player waits until the lights 5 indicate the column 2 preferred and then control button 6 is pressed. This will cause lights in the selected column 2 to be illuminated sequentially behind the markings 3, thereby simulating the movement of a coin across the display. The distance of movement depends on the speed or distance of the depression of button 6, and therefore the "coin" will stop at one of the markings, or may move so far as to be lost (i.e. by reaching the end of the column). If the marking at which the "coin" stops is a scoring position 4, the player gets that number of points. The skill of the game is to press the button 6 by the correct amount to ensure a scoring movement.

The second play, either by the same or another player (the player being indicated by lights 7), can be on the same or a different column 2. If the column is different the movement of the "coin" occurs in exactly the same way as before. If, however, the same column 2 is selected, then there is the possibility that the movement of the second "coin" could reach the position the first "coin" has stopped at. In this case the first "coin" is knocked forward by the amount the second "coin" should have travelled (as determined by the operation of the button 6) whilst the second "coin" stops at the point of impact with the first "coin", i.e. the position immediately behind the position of the first "coin" before impact.

The first "coin" will thus be moved to simulate an impact. If the first "coin" is knocked to the end of the column 4, it could be lost or, if it is a "coin" of another player, be returned.

A game may permit each player to have three "coins" and obviously there can be an element of competition between the players, in addition to the "competition" against the machine.

There are two further developments. Firstly, controls 8 trigger diagonal movement of the "coin" in play, this diagonal movement ceasing when the "coin" reaches either of the side columns, when the "coin" has reached the limit of its movement distance, or when the "coin" strikes another "coin" (that other "coin" then continuing the movement). Secondly, a display 9 indicates the "spring tension". A skilled player could learn by constant repetition the exact speed or distance of depression of the button 6 and thereby always score. Therefore, the game can vary the ratio of the distance of movement of the "coins" to speed or distance of movement of the button 6 to prevent one ratio being learned. This could be varied in a random way between e.g. the four spring tensions illustrated in FIG. 1.

For commercial use the number of points scored by causing the "coins" to end up at scoring positions 4 can result in a money pay-out. Different sums can be paid out in dependance on the score achieved e.g. all or part of the money paid in, or even more to simulate a "jackpot".

Figure 2:
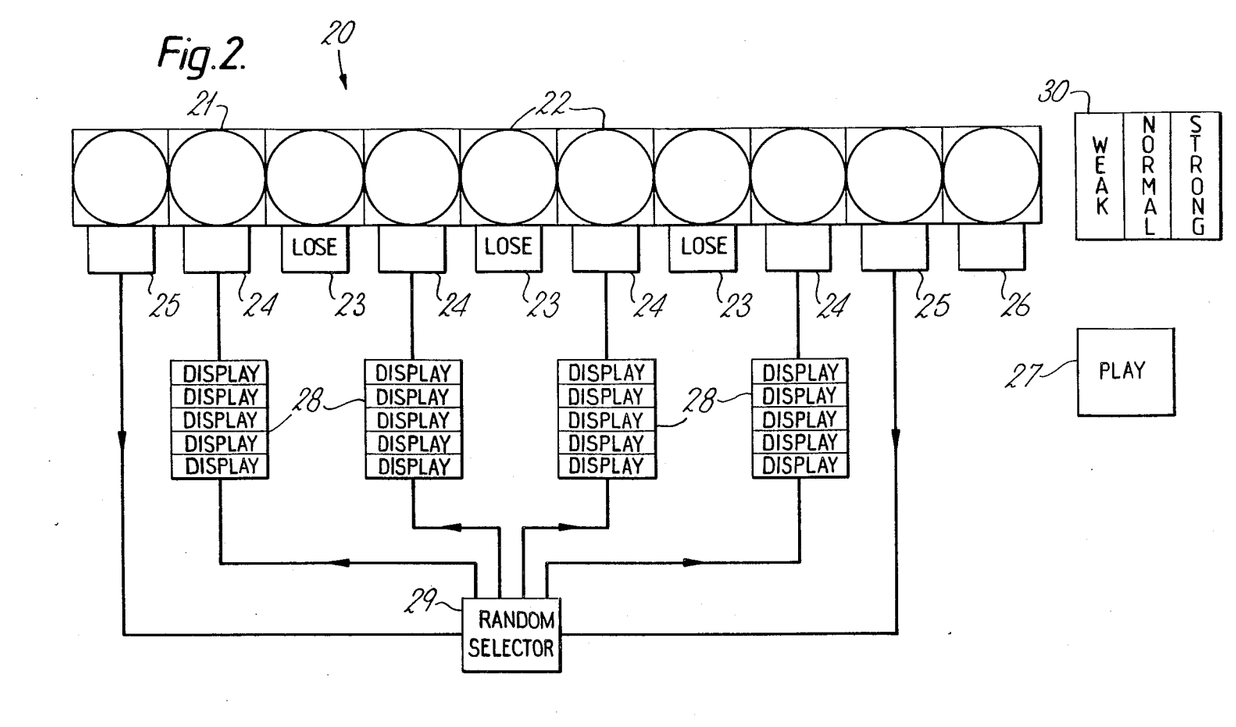
FIG. 2 shows a second embodiment of a shove-a-coin game.

Referring now to FIG. 2, a second embodiment of a game according to the present invention has a display 20 with a scale 21 with markings 22 representing coins. The sale 21 also has game result indicators adjacent the markings 22. These result indicators fall into three groups. Firstly, there are those indicators 23 which correspond to a losing result. Secondly, there are those indicators 24 corresponding to a winning result. Finally, there are two further indicators 25 which may correspond to a losing result, but may, a shown in FIG. 2, alternatively result in a "partial win". In addition to these three groups of indicators there may also be a start indicator 26. FIG. 2 also shows that each win indicator has an associated display bank 28, with each bank 28 having five display lines (although the number of display lines is arbitrary).

As in the game of FIG. 1, a control button 27 is pressed to cause lights to be illuminated sequentially behind the markings 22, thereby simulating the movement of a coin across the display against the scale 21. Again, the distance of movement depends on the speed or distance of the depression of the button, and therefore the "coin" will stop at one of the markings 22. If the marking 22 at which the "coin" stops is adjacent one of the "lose" indicators 23, then the game is over. If, on the other hand, the "coin" stops adjacent a winning indicator 24, then one of the display lines of display banks 28 associated with the "win" indicators 24, is illuminated. The player may then have another opportunity to "shove-a-coin" by pressing button 27. The object of the game is to light all five lines of any one of the display banks 28. When this happens, a win may result, and the game pay-out money or a token. The skill of this game is to press the button 27 by the correct amount to ensure repeated scoring results, preferably all at the same marking 22.

In this game, it would be possible (as in the game of FIG. 1) for the game to be lost if the "coin" moves to the end of the scale 21, or does not move sufficiently to reach the first scoring position. To increase the chances of success, however, a "coin" which stops adjacent the indicators 25 may result in a signal being fed to a circuit 29 which causes one display selected at random from the display banks 28 to be triggered. In this way, the banks 28 are slowly filled by what otherwise would be losing plays. However, it would, in commercial situations, be necessary that a player whose "coin" moves to a marking 22 adjacent the indicators 25 must pay again to have another play.

As with the game of FIG. 1, it is possible to vary the ratio of the distance of movement of the "coin" to the speed or distance of movement of the button 27. This could be varied in a random way, between e.g. three "spring tensions" indicated by a display 30. In this way, it is not possible to learn by constant repetition the exact winning movement of the button 27.

Figure 3:
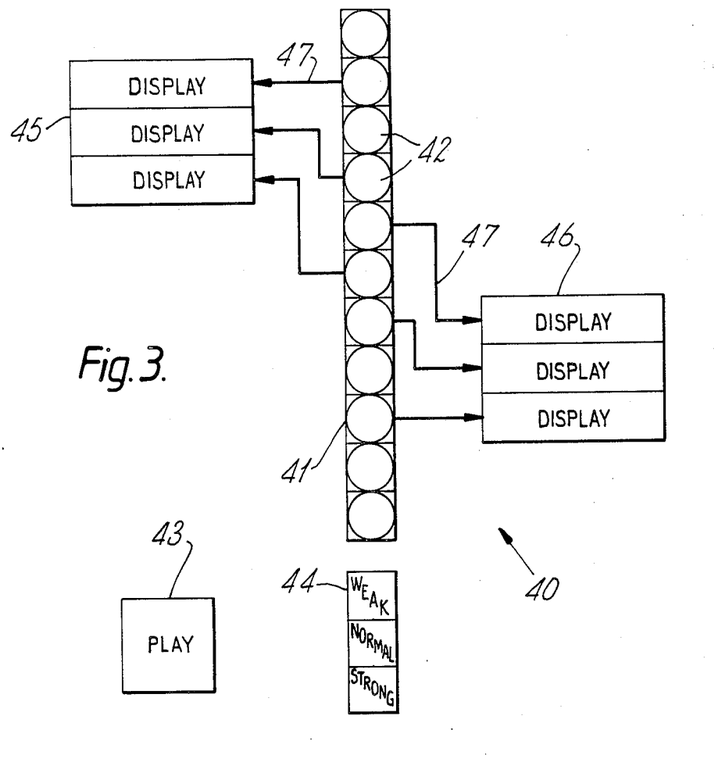
FIG. 3 shows a third embodiment of a shove-a-coin game.

FIG. 3 shows another variation of a shove-a-coin game. Again, there is a display 40 with a scale 41 with markings 42 representing "coins". Again, operation of a button 43 causes lights to move behind the markings 42, simulating the movement of the coin along the scale 41, the distance of movement being determined by the speed or distance of movement of the button 43. Furthermore, there may be again a random variation in the ratio of the distance of the movement of the coin to the movement of the button 43, again displayed by a display 44.

In the game of FIG. 3, some of the markings, corresponding to winning results, are connected to one of two display banks 45,46 by e.g. visual indications 47, the markings 42 which are not so connected corresponding to losing results. In the arrangement of FIG. 3, each display bank 45,46 has three display lines, each display line connected to one of the markings 42. It would be possible for either illumination of any one of the display lines of the display banks 45,46 to result in a win, or for a win to result only when all three display lines of the display banks 45,46 are illuminated. The most preferable arrangement, however, is for the two display banks to be different, with e.g. a win resulting when any one of the display lines of display bank 45 are illuminated, or when all three of the display lines of display bank 46 are illuminated. If there is, in commercial situations, a financial incentive for the player to try for illumination of all three display lines of display bank 46, rather than one of the display lines of display bank 45, then this will be a reason for attempting the more difficult result. With this game, if the button 43 is pressed too fast, or too far, the "coin" will move to the end of the scale 41, resulting in a loss, and similarly if it is not pressed fast enough, or not pressed sufficiently far, then the "coin" will not move from the start position and again the game will be lost.

Figure 4:
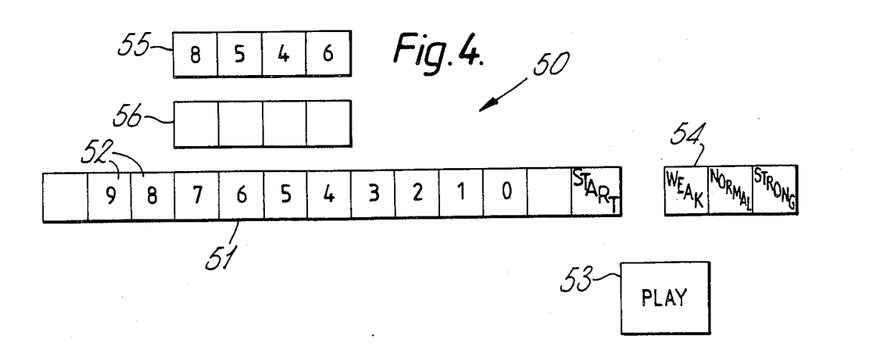
FIG. 4 shows a fourth embodiment of a shove-a-coin game.

In the game of FIG. 4, the arrangement is similar, with a display 50 having a scale 51 with markings 52 along which a "coin" is caused to move by depression of a button 53. The ratio of the distance of movement of the "coin" on the scale 51 to the movement of the button 53 may be varied randomly, the ratio being displayed by a display 54. In this game, some of the markings 52 correspond to specific integers, again with the beginning and end of the scale corresponding to a losing result. There are two other displays 55,56, one of which (indicator 55 in FIG. 4) displays a randomly selected four-integer number. The purpose of the game is to cause the "coin" to move along the scale 51 to numbers sequentially corresponding to the number displayed in display 55. The integers achieved by the player are then displayed in display 56. Thus, the purpose of this game is to cause the "coin" to stop at specific numbers sequentially, although a "lesser" result may be obtained if the numbers displayed in the display 55 are achieved, but not in the order so indicated.

In each of the games of FIGS. 1 to 4, the underlying idea is that the player causes a "coin", represented by lights behind a scale, to move along that scale to a position resulting either in a win or a loss. The exact process by which a win is recorded of course varies from game to game.

Figure 5:
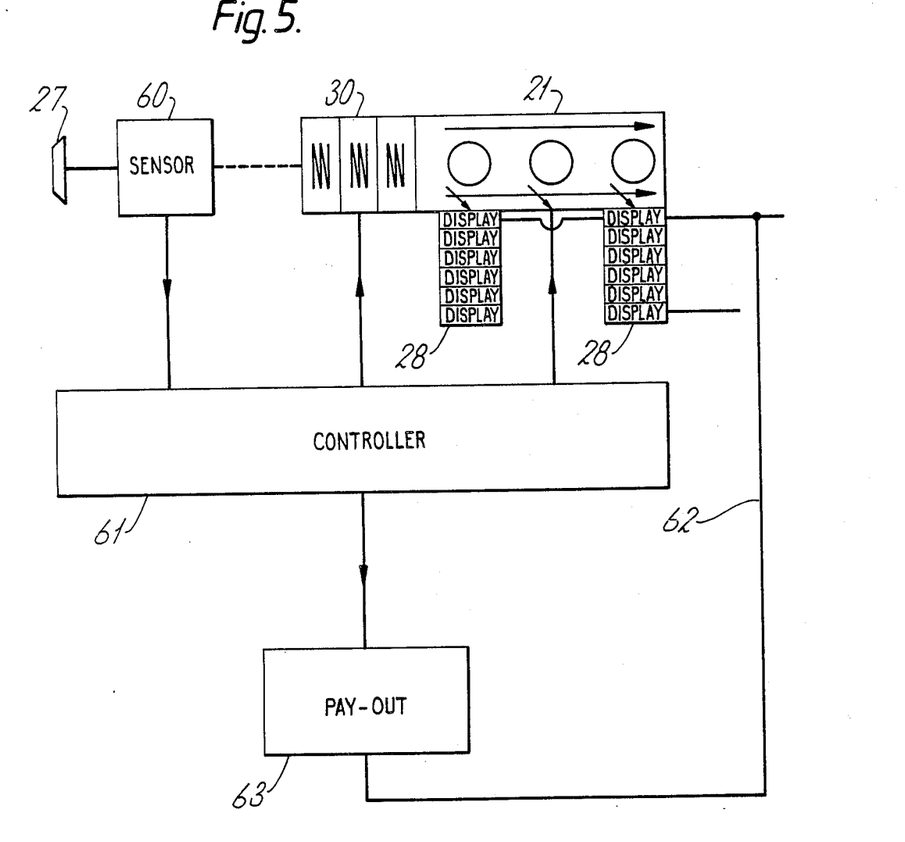
FIG. 5 shows a block diagram of the electronic controls for the game of FIG. 2.

A control system for controlling the game of FIG. 2 will now be described with reference to FIGS. 5 to 9. It will be appreciated, however, that this control system may be adapted to any of the other embodiments without difficulty. Referring first to FIG. 5, the button 27 is connected to a movement sensor 28 which detects the speed of movement, or the distance of movement, of the button 27 and supplies a signal corresponding to this movement to a controller unit 61. The unit 61 determines the "spring constant" and triggers the display 30 to display this as one of three alternatives. The unit 61 also causes lights behind the scale 21 to be illuminated sequentially, causing the apparent movement of the "coin". The whole of the scale 21 is not shown in FIG. 5, but it can be seen that when the "coin" stops at one of the winning positions, a signal is supplied to the display banks 28, causing one of the display lines to be illuminated. When all five display lines are triggered, a signal is sent via line 62 to a pay-out unit 63, which may pay-out money or print a ticket as appropriate.

Figure 6:
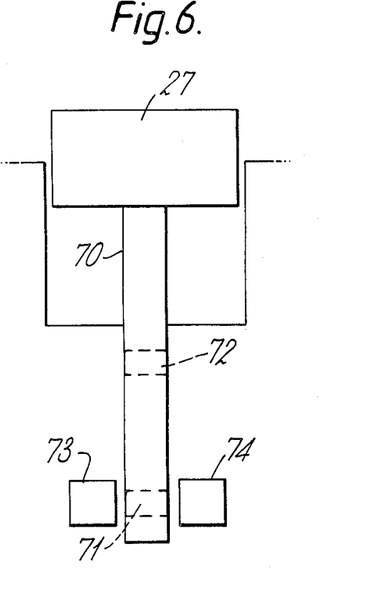
FIG. 6 shows a detail of the movement sensor control of FIG. 2.

The movement detector 60 of the circuit of FIG. 5 will now be described in detail. The movement detector 60 is preferably an optical system which is shown in FIG. 6. The button 27 is connected to a plunger 70 with two holes 71,72 in it. A radiation source 13 (e.g. an LED) generates radiation, which when the button 27 is in the uppermost position as illustrated, passes through the lower hole 71 to a detector 74. When the button 27 is pressed, the radiation from the source 73 is blocked until the upper hole 72 arrives adjacent the source 73. Then the radiation again will be detected by the detector 74. The time the radiation is blocked may then be calculated electronically by the unit 61, and the lights behind the scale 21 illuminated accordingly.

Thus, for times between say 1/60 s and 1/20 s, a "coin" would move along the scale 21. For times less than 1/60 s, the coin would travel to the end of the scale 21 and be lost. For times more than 1/20 s, the "coin" does not move on the scale 21. As mentioned above, the ratio of the distance of movement of the "coin" to the time recorded for movement of the button 6, i.e. the time the light is blocked, can be varied electronically.

The button 27 will normally be biased to the upper position, with holes 71 aligned with the source 73 and detector 74 by a spring (not shown).

Figure 7:
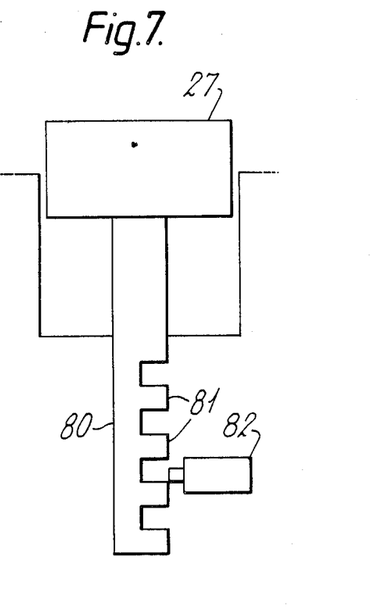
FIG. 7 shows another variant of the movement sensor of FIG. 6.
Figure 8A:
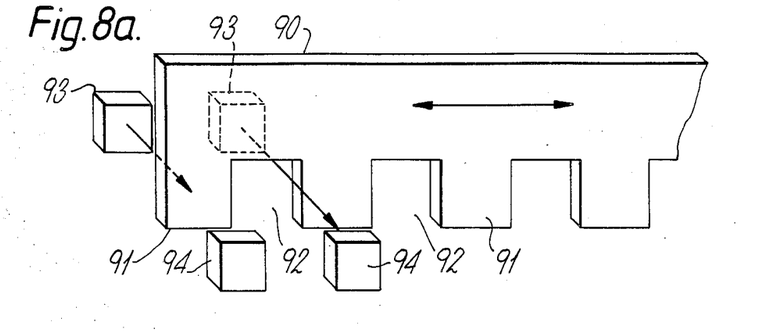
FIGS. 8a to 8f show yet another variant of the movement sensor.
Figure 8B:
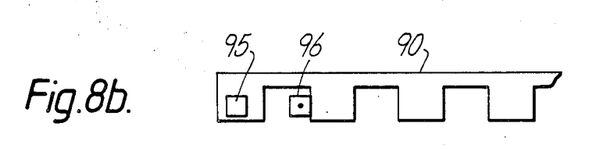
Figure 8C:
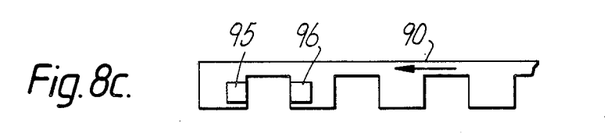
Figure 8D:
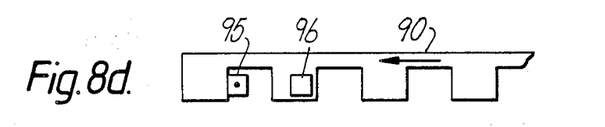
Figure 8E:
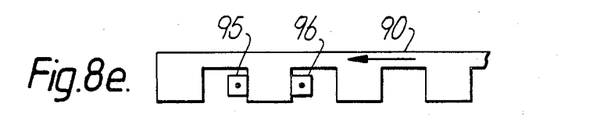
Figure 8F:
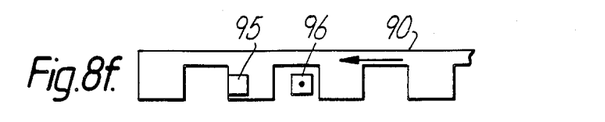

FIG. 7 shows an alternative movement detector in which the movement of the "coin" is determined by the distance of depresssion of the button 27. Again, the button 27 is connected to a plunger 80, but this time the plunger 80 has teeth 81 which engage a sensor 82. The movement of the "coin" is then determined by the number of teeth 81 which pass the sensor 82 when the button 27 is pressed. Depression of the button 27 more than a predetermined number of teeth causes the "coin" to move to the end of the scale 21 and be lost.

Of these two movement detectors, the optical system of FIG. 2 is preferred, and FIGS. 8a to 8f show an improved modification of this. Again, the button 27 is connected to a plunger 90, which again has teeth 91 so that a series of apertures 92 are defined along its length. Two radiation sources 93 are placed on one side of the plunger 90, and associated detectors 94 placed on the other side so that the radiation beam between the sources 93 and the detectors 94 will either be obscured by the teeth 91, or pass through the apertures 92, as appropriate depending on the position of the plunger 90. Thus, movement of the plunger 90 will be detected by alternate blocking and unblocking of the radiation beam between the sources 93 and the detectors 94.

However, as illustrated in FIGS. 8b to 8f, the pattern of blocking and unblocking of the sources 93 and detectors 94 is not exactly the same. In the arrangement shown in FIG. 8, the distance along the plunger 90 between the two beams is chosen so that when the state (obstructed or not) of one beam is being altered, the state of the other does not change. This is achieved by making the distance between the two beams along the plunger an odd multiple of half the width of each projection 91 or aperture 92. Thus, referring to FIGS. 8b to 8f, in a first position, one source and detector pair 95 is blocked, whilst the other pair 96 is unblocked. This is the position shown in FIG. 8b. When the plunger 90 moves a small amount, the source detector pair 96 becomes blocked, but the other pair 95 is not yet unblocked. It is only when the plunger has moved further, to the position shown in FIG. 8d, that the first pair 95 becomes unblocked, the second pair 96 remaining blocked. Further movement of the plunger 90 to the position shown in FIG. 8e, results in both pairs 95,96 becoming unblocked, and still further movement, to the position shown in FIG. 8f, causes re-blocking of the first pair 95, with the second pair 96 being unblocked, i.e. the plunger 90 has moved by one projection, with the outputs of the source-detector pairs 95,96 of FIG. 8f corresponding to that of FIG. 8b. Thus, the precision by which the control circuitry may determine the position of the plunger 90 is one quarter the pitch of the projection 91 and apertures 92. This arrangement could be used either for speed meausurement or for distance measurement, although the former is preferred.

Figure 9:
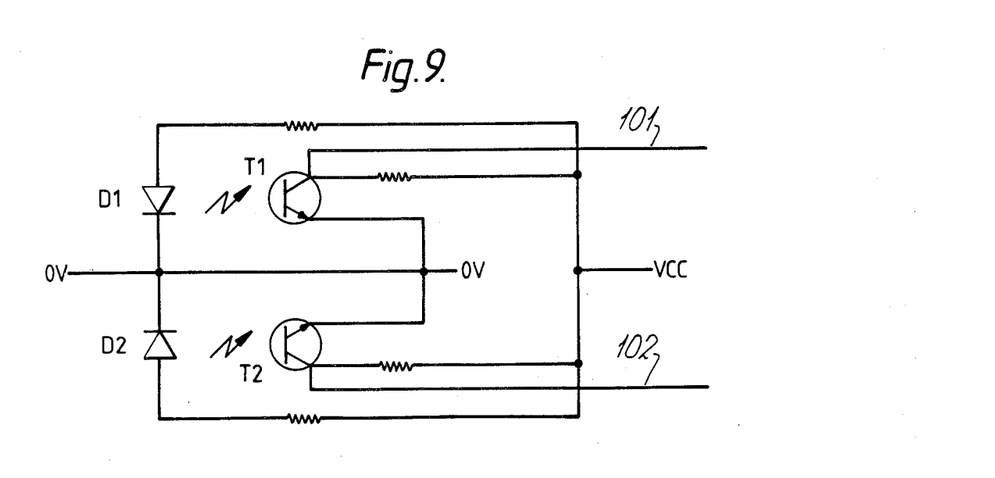
FIG. 9 shows a detail of an optical sensor suitable for use with the controls of FIG. 5.

Finally, referring to FIG. 9, the circuit forming the sources and detectors is illustrated Each source consists of a light-emitting diode D1,D2 (infra-red radiation is included within the term "light"), the two detectors are formed by opto-transistors T1,T2 respectively. Each diode D1,D2 and each transistor T1,T2 is connected between earth (0V) and a power voltage $V_{CC}$. When light from one of the diodes D1,D2, reaches the associated transistor T1,T2 (i.e. is not blocked by one the projections on the plunger) a signal is generated on an output line 101,102 as appropriate, and by monitoring the signals on the output line 101,102, the movement of the plunger may be detected.

Thus, it becomes possible to simulate a shove-a-coin game electronically, by ensuring that the movement of the "coin" is determined by the speed, or distance, of depression of a control button Furtnermore, the winning positions of the "coin" corresponds to such movement only within predetermined limits, so that skill is necessary in depressing the control button by an amount sufficient to cause a win to result. In this way, it is possible for the game to be won not by force, but by the ability of the player to move the control button by the right amount.

What is claimed is:

1. An elecrionic game, comprising;
   a display having at least one scale and at least one activatable win indicator, said at least one scale having a multiplicity of discrete locations defining a fixed path of sequential locations, a plurality of said discrete locations corresponding to a win result in said game, and those of said discrete locations other than said plurality of discrete locations corresponding to at least one other game result;
   a movable control movable over a fixed path;
   means for detecting movement of said movable control and for generating an electronic signal determined by the speed of said movement of said movable control over said fixed path;
   at least one indicium on said display;
   means for causing the position of said at least one indicium to move on said fixed path on said display relative to said at least one scale to a final position determined by said electronic signal, wherein, for the speeds of movement of said movable control between a first predetermined speed and a second predetermined speed, said final position of said at least one indicium corresponds to one of said locations on said scale; and
   wherein said at least one activatable win indicator is associated with said plurality of locations that corresponds to win results, such that the movement of said indicium to one of said plurality of locations that corresponds to win results causes activation of said activatable win indicator.

2. An electronic game according to claim 1, wherein said means for generating an electronic signal generates an electronic signal that is determined by the average speed of movement of said control over a predetermined distance.

3. An electronic game according to claim 1, wherein said at least one scale has an end location, and
   for speeds of movement of said movable control less than said first predetermined speed, said means for causing the position of said at least one indicium to move on said display inhibits movement of said indicium; and
   for speeds of movement of said movable control greater than said second predetermined speed, said means for causing the position of said indicium to move on said display causes movement of said indicium past all said locations on said at least one scale except said end location.

4. An electronic game according to claim 1, wherein said electronic signal has a proportional relationship to said speed of movement of said movable control, and means are provided for varying said proportional relationship.

5. An electronic game according to claim 1, wherein said movable control includes a member having two opposed sides, a plurality of apertures and parts adjacent said apertures, and said means for detecting movement of said control includes at least one radiation source for emitting radiation located adjacent one of said opposed side of said member and at least one radiation detector for detecting said radiation adjacent the other of said opposite sides of said member, whereby movement of said movable control causes movement of said member such that said radiation alternately passes from said radiation source to said radiation detector, and is blocked by said parts adjacent said apertures, during said movement of said member.

6. An electronic game according to claim 1, wherein said display includes a plurality of lights, and said indicium is represented by one of said plurality of lights, whereby sequential illumination of said plurality of lights represents moement of said indicium.

7. An electronic game as defined in claim 1, wherein the at least one scale of discrete locations, including the plurality of locations that correspond to win results, are displayed to the game user prior to the user manupulating the movable control, so that the user can select the location at which he will attempt to place the indicium prior to manipulating the movable control.

8. An electronic game, comprising:
   a display having at least one scale and at least one activatable win indicator, said at least one scale having a multiplicity of discrete locations defining a path of sequential locations, a plurality of said discrete locations corresponding to a win result in said game, and those of said discrete locations other than said plurality of discrete locations corresponding to at least one other game result;

a movable control movable over a fixed path;

means for detecting movement of said movable control, and for generating an electronic signal determined by the total distance of movement of said movable control, said generation occurring after said movable control has completed its movement;

at least one indicium on said display;

means for causing the position of said at least one indicium to move on said fixed path said display relative to said at least one scale to a final position determined by said electronic signal, wherein, for distances of movement of said movable control between a first predetermined distance and a second predetermined distance, said final position of said at least one indicium corresponds to one of said locations on said scale; and wherein said at least one activatable win indicator is associated with said plurality of locations that correspond to win results such that the movement of said indicium to one of said plurality of locations that corresponds to win results causes activation of said activatable win indicator.

9. An electronic game according to claim 8, wherein said at least one scale has an end location, and:

for distance of movement of said movable control less than said first predetermined distance, said means for causing the position of said at least one indicium to move on said display inhibits movement of said indicium; and for speeds of movement of said movable control greater than said second predetermined distance, said means for causing the position of movement of said at least one indicium to move on said display past all said locations on said at least one scale except said end location.

10. An electronic game according to claim 8, wherein said electronic signal has a proportional relationship to said distance of movement of said movable control, and means are provided for varying said proportional relationship.

11. An electronic game as defined in claim 8, wherein the at least one scale of discrete locations, including the plurality of locations that correspond to win results, are displayed to the game user prior to the user manipulating the movable control, so that the user can select the location at which he will attempt to place the indicium prior to manipulating the movable control.

12. An electronic game comprising:

a display having a plurality of scales, each of said scales having a multiplicity of discrete locations defining a fixed path of sequential location, each of said locations corresponding to a game result;

a first movable control that is movable over a fixed path;

first detection means for detecting movement of said first movable control, and for generating a first electronic signal determined by the speed of movement of said movable control over said fixed path;

at least one indicium on said display;

means for causing said at least one indicium to move on said display relative to a selected one of said scales, towards a final position determined by said first electronic signal, wherein, for speeds of movement of said movable control between a first predetermined speed and a second predetermined speed, said final position corresponds to one of said locations on said selected one of said scales;

a second movable control;

second detection means for detecting movement of said second movable control and for generating a second electronic signal during the movement of said indicium relative to said selected one of said scales; and means for causing said indicium to move from said selected one of said scales to a further one of said scales in response to said second electronic signal, and to move on said further one of said scales toward a further final position determined by said first electronic signal, wherein, for speeds of movement of said first movable control between a first predetermined speed and a second predetermined speed, said further final position corresponds to one of said locations on said further one of said scales.

13. An electronic game according to claim 12 wherein each of said scales has an end location, wherein, for speeds of movement of said first movable control that are less than said first predetermined speed, said means for causing the position of said indicium to move on said display inhibits movement of said indicium; and wherein, for speeds of movement of said first movable control that are greater than said second predetermined speed, said means for causing the position of said indicium to move on said scale causes movement of said indicium past all said locations on said selected scale except said end location of said selected scale and, when said second movable control is moved, said indicium moves on said further one of said scales to said end location of said further one of said scales.

14. An electronic game according to claim 12, wherein said first electronic signal has a proportional relationship to said speed of movement of said first movable control and means are provided for varying said proportional relationship.

15. An electronic game comprising:

a display having a plurality of scales, each of said scales have a multiplicity of discrete location defining a fixed path of sequential locations, each of said locations corresponding to a game result;

a first movable control that is movable over a fixed path;

first detection means for detecting movement of said first movable control, and for generating a first electronic signal determined by the distance of movement of said movable control over said fixed path;

at least one indicium on said display;

means for causing at least one indicium to move on said display relative to a selected one of said scales, towards a final position determined by said first electronic signal, wherein, for speeds of movement of said movable control between a first predetermined distance and a second predetermined distance, said final position corresponds to one of said locations on said selected one of said scales;

a second movable control;

second detection means for detecting movement of said second movable control and for generating a second electronic signal during the movement of said indicium relative to said selected one of said scales; and means for causing said indicium to move from said selected one of said scales to a further one of said scales in response to said second electronic signal, and to move on said further one of said scales toward a further final position determined by said first electronic signal, wherein, for distances of movement of said first movable control between a first predetermine distance and a second predetermined distance, said further final position corresponds to one of said locations on said further one of said scales.

16. An electronic game according to claim 15 wherein each of said scales has an end location, wherein, for distances of movement of said first movable control that are less than said first predetermined distance, said means for causing the position of said indicium to move on said display inhibits movement of said indicium, and wherein, for distances of movement of said first movable control that are greater than said second predetermined distance, said means for causing the position of said indicium to move on said scale causes movement of said indicium past all said locations on said selected scale except said end location of said selected scale and, when said second movable control is moved, said indicium moves on said further one of said scales to said end location of said further one of said scales.

17. An electronic game according to claim 15, wherein said first electronic signal has a proportional relationship to said distance of movement of said first movable control and means are provided for varying said proportional relationship.

* * * * *

UNITED STATES PATENT AND TRADEMARK OFFICE
CERTIFICATE OF CORRECTION

PATENT NO. : 4,770,415

DATED : September 13, 1988

INVENTOR(S) : David J. Evans, David K. Thomas both of Cardiff, UK

It is certified that error appears in the above-identified patent and that said Letters Patent is hereby corrected as shown below:

Claim 6, line 57, "moement" should be --movement--;

Signed and Sealed this

Seventh Day of February, 1989

*Attest:*

DONALD J. QUIGG

*Attesting Officer*  *Commissioner of Patents and Trademarks*